(12) United States Patent
Lucas et al.

(10) Patent No.: US 7,479,754 B2
(45) Date of Patent: Jan. 20, 2009

(54) HYBRID ELECTRIC LAWNMOWER

(75) Inventors: Delbert E. Lucas, Bowling Green, KY (US); Justin Lucas, Lynchburg, VA (US); Ryan Jay Lucas, Atlanta, GA (US)

(73) Assignee: Desa IP LLC, Miami, FL (US)

( * ) Notice: Subject to any disclaimer, the term of this patent is extended or adjusted under 35 U.S.C. 154(b) by 0 days.

(21) Appl. No.: 11/550,104

(22) Filed: Oct. 17, 2006

(65) Prior Publication Data

US 2008/0089673 A1     Apr. 17, 2008

(51) Int. Cl.
*G05B 11/28* (2006.01)
(52) U.S. Cl. .................. 318/599; 318/811; 318/139; 56/10.1; 56/10.8; 56/11.1
(58) Field of Classification Search .............. 318/599, 318/811, 139; 56/10.1, 10.6, 10.8, 11.1
See application file for complete search history.

(56) References Cited

U.S. PATENT DOCUMENTS

| 963,146 | A | 7/1910 | Harrison |
|---|---|---|---|
| 1,115,350 | A | 10/1914 | Vincent |
| 1,357,396 | A | 11/1920 | Gater |
| 1,383,178 | A | 6/1921 | Voges |
| 1,387,578 | A | 8/1921 | Yost |
| 1,401,156 | A | 12/1921 | Jenkins |
| 1,490,127 | A | 4/1924 | Peters |
| 1,558,465 | A | 10/1925 | Dahl |
| 1,567,055 | A | 12/1925 | Huff |
| 1,603,637 | A | 10/1926 | Ott |
| 1,643,656 | A | 9/1927 | Haselton |
| 1,669,471 | A | 5/1928 | Jones |
| 1,674,847 | A | 6/1928 | Watson |
| 1,725,487 | A | 8/1929 | Steinmetz et al. |
| 1,819,791 | A | 8/1931 | Reed |
| 1,823,215 | A | 9/1931 | Seal |
| 1,827,559 | A | 10/1931 | Beazley |
| 1,829,690 | A | 10/1931 | Turner |
| 1,866,380 | A | 7/1932 | Wagner |
| RE18,944 | E | 9/1933 | Beazley |
| 1,954,579 | A | 4/1934 | Smith |
| 2,053,535 | A | 9/1936 | Schielein |
| D101,512 | S | 10/1936 | Young et al. |
| 2,167,222 | A | 7/1939 | Shelor |
| 2,185,659 | A | 1/1940 | Chernow |
| 2,237,521 | A | 4/1941 | Frazier |
| 2,298,135 | A | 10/1942 | Klein |
| 2,417,613 | A | 3/1947 | Radabaugh |
| 2,458,200 | A | 1/1949 | Renfroe et al. |
| D154,108 | S | 6/1949 | Emmons |
| 2,480,944 | A | 9/1949 | Malpass |
| 2,485,729 | A | 10/1949 | Gentry |
| 2,496,022 | A | 1/1950 | Remonte |
| 2,498,609 | A | 2/1950 | Reil |

(Continued)

*Primary Examiner*—Rina I Duda
(74) *Attorney, Agent, or Firm*—Suiter Swantz pc llo

(57) ABSTRACT

A hybrid electric lawnmower is described which includes an electric motor operating the blade and the ability to drive the motor from either 120 VAC line voltage or from a battery pack. There is a user selectable power selection switch for switching between DC or AC power and also a boost and conserve feature which allows for increased speed of the blade as necessary. Running the mower at the conserve setting prolongs battery pack duration per charge.

32 Claims, 10 Drawing Sheets

U.S. PATENT DOCUMENTS

| | | |
|---|---|---|
| 2,498,796 A | 2/1950 | Downer |
| D158,847 S | 6/1950 | Flanigan |
| 2,514,278 A | 7/1950 | Dunn et al. |
| 2,521,262 A | 9/1950 | Smith |
| 2,547,328 A | 4/1951 | Koch et al. |
| 2,549,317 A | 4/1951 | Laughlin |
| 2,554,790 A | 6/1951 | Berdan |
| 2,592,856 A | 4/1952 | Brockman |
| 2,597,735 A | 5/1952 | Jepson |
| D167,129 S | 7/1952 | Abel et al. |
| D168,683 S | 1/1953 | Heineke |
| 2,633,688 A | 4/1953 | Yeck et al. |
| D172,807 S | 8/1954 | Rosenberg |
| D172,936 S | 8/1954 | Phelps |
| 2,690,892 A | 10/1954 | Bar |
| 2,700,862 A | 2/1955 | Abel |
| 2,702,448 A | 2/1955 | Smith |
| 2,708,977 A | 5/1955 | Scheppe |
| 2,709,882 A | 6/1955 | Abel |
| 2,716,559 A | 8/1955 | Boyce |
| 2,724,229 A | 11/1955 | Graham |
| 2,728,182 A | 12/1955 | Fulton et al. |
| 2,763,116 A | 9/1956 | Flinchbaugh et al. |
| 2,766,573 A | 10/1956 | Shewmon |
| 2,770,085 A | 11/1956 | Laughlin |
| D179,511 S | 1/1957 | Graham |
| 2,793,484 A | 5/1957 | McNeill et al. |
| 2,793,485 A | 5/1957 | Emmons et al. |
| RE24,594 E | 1/1959 | Smith |
| 2,867,960 A | 1/1959 | Stiles et al. |
| D184,861 S | 4/1959 | Ellies |
| 2,906,081 A | 9/1959 | Flanigan |
| 2,908,128 A | 10/1959 | Mauro |
| 2,909,885 A | 10/1959 | Smith |
| 2,926,478 A | 3/1960 | Jepson |
| 2,926,926 A | 3/1960 | Rowe et al. |
| 2,938,323 A | 5/1960 | Livingston et al. |
| 2,941,346 A | 6/1960 | Perry |
| 2,942,397 A | 6/1960 | Clark |
| 2,970,419 A | 2/1961 | Lieberman |
| 2,979,878 A | 4/1961 | Kaposta |
| 2,983,057 A | 5/1961 | Erickson |
| D191,675 S | 10/1961 | Ernest |
| 3,017,733 A | 1/1962 | Evans |
| D192,373 S | 3/1962 | Mascaro |
| D192,605 S | 4/1962 | Mascaro |
| 3,028,717 A | 4/1962 | West |
| 3,034,275 A | 5/1962 | Happe et al. |
| 3,035,386 A | 5/1962 | Jepson et al. |
| D193,197 S | 7/1962 | Czerwonky |
| 3,077,066 A | 2/1963 | Nokes |
| 3,128,840 A | 4/1964 | Barrett, Jr. |
| 3,144,258 A | 8/1964 | Ottosen et al. |
| 3,147,987 A | 9/1964 | Ritums |
| 3,212,244 A | 10/1965 | Wilgus |
| 3,217,824 A | 11/1965 | Jepson |
| 3,221,481 A | 12/1965 | Mattson et al. |
| 3,230,695 A | 1/1966 | West |
| 3,271,939 A | 9/1966 | Granger, Jr. et al. |
| 3,298,163 A | 1/1967 | Ottosen et al. |
| D207,230 S | 3/1967 | Stewart et al. |
| D207,326 S | 4/1967 | Stewart et al. |
| D207,721 S | 5/1967 | Stewart et al. |
| D207,856 S | 6/1967 | Averitt et al. |
| 3,350,864 A | 11/1967 | Sheps et al. |
| 3,375,338 A | 3/1968 | Delf |
| D211,264 S | 6/1968 | Stewart et al. |
| 3,456,430 A | 7/1969 | Maloney |
| 3,481,123 A | 12/1969 | Lessig, III |
| 3,485,017 A | 12/1969 | Duran et al. |
| 3,485,018 A | 12/1969 | Beckering et al. |
| 3,496,706 A | 2/1970 | Mattson |
| 3,500,085 A | 3/1970 | Smith |
| 3,500,620 A | 3/1970 | Duran et al. |
| D218,766 S | 9/1970 | Musichuk |
| 3,550,714 A | 12/1970 | Bellinger |
| 3,564,186 A | 2/1971 | Mittelstadt |
| 3,570,226 A | 3/1971 | Haverkamp et al. |
| 3,570,227 A | 3/1971 | Bellinger |
| 3,581,480 A | 6/1971 | O'Connor, III |
| 3,583,138 A | 6/1971 | Mattson |
| 3,586,275 A | 6/1971 | Mittelstadt |
| 3,593,505 A | 7/1971 | Mittelstadt |
| 3,593,950 A | 7/1971 | Tetzlaff |
| D221,574 S | 8/1971 | Bunyea |
| 3,603,065 A | 9/1971 | Weber |
| 3,613,338 A | 10/1971 | Furtaw |
| 3,617,786 A | 11/1971 | Stielper |
| 3,631,659 A | 1/1972 | Horowitz |
| 3,641,749 A | 2/1972 | Dwyer, Jr. et al. |
| 3,657,868 A | 4/1972 | Cousino |
| 3,659,170 A | 4/1972 | Burkett et al. |
| 3,696,593 A | 10/1972 | Thorud et al. |
| 3,731,471 A | 5/1973 | Bening |
| 3,732,671 A | 5/1973 | Allen et al. |
| 3,733,794 A | 5/1973 | Allen |
| 3,789,939 A | 2/1974 | Geislinger |
| 3,800,902 A | 4/1974 | Keller |
| 3,916,280 A | 10/1975 | Heindl |
| 3,924,389 A | 12/1975 | Kita |
| 3,948,024 A | 4/1976 | Allen et al. |
| 3,955,653 A | 5/1976 | Comer |
| 3,969,875 A | 7/1976 | Nofel |
| 3,970,913 A | 7/1976 | Heindl |
| 3,980,068 A | 9/1976 | Karsten et al. |
| 4,003,190 A | 1/1977 | Braun et al. |
| 4,008,423 A | 2/1977 | Christianson et al. |
| 4,081,737 A | 3/1978 | Miyahara |
| D249,266 S | 9/1978 | Furuya |
| 4,145,864 A | 3/1979 | Brewster, Jr. |
| 4,178,741 A | 12/1979 | Lonn et al. |
| 4,181,206 A | 1/1980 | Seilenbinder |
| 4,236,494 A | 12/1980 | Fairchild |
| 4,244,160 A | 1/1981 | Carolan |
| 4,267,914 A | 5/1981 | Saar |
| 4,294,327 A | 10/1981 | Howard |
| 4,307,325 A | 12/1981 | Saar |
| 4,318,266 A | 3/1982 | Taube |
| 4,321,523 A | 3/1982 | Hammel |
| 4,333,302 A | 6/1982 | Thomas et al. |
| 4,371,906 A | 2/1983 | Alessio et al. |
| 4,412,158 A | 10/1983 | Jefferson et al. |
| 4,430,604 A | 2/1984 | Loganbill et al. |
| 4,447,786 A | 5/1984 | Saar et al. |
| 4,489,267 A | 12/1984 | Saar et al. |
| 4,503,370 A | 3/1985 | Cuneo |
| 4,527,101 A | 7/1985 | Zavis et al. |
| 4,536,757 A | 8/1985 | Ijntema |
| 4,550,277 A | 10/1985 | Carney |
| 4,628,233 A | 12/1986 | Bradus |
| 4,764,715 A | 8/1988 | Kowalewski et al. |
| 4,870,811 A | 10/1989 | Steele |
| 4,878,338 A | 11/1989 | Aldred et al. |
| 4,887,415 A | 12/1989 | Martin |
| 4,893,067 A | 1/1990 | Bhagwat et al. |
| 4,905,300 A | 2/1990 | Bhagwat et al. |
| RE33,379 E | 10/1990 | Bradus |
| 4,964,265 A | 10/1990 | Young |
| 4,987,729 A | 1/1991 | Paytas |
| 4,990,843 A | 2/1991 | Moren et al. |
| 5,028,853 A | 7/1991 | Brown, Jr. et al. |
| 5,085,043 A | 2/1992 | Hess et al. |
| 5,086,491 A | 2/1992 | Cuneo |
| D330,210 S | 10/1992 | Sirois et al. |

| | | | | | | |
|---|---|---|---|---|---|---|
| 5,173,650 | A | 12/1992 | Hedlund | D422,605 | S | 4/2000 | Danthois |
| D333,309 | S | 2/1993 | Hess et al. | D426,836 | S | 6/2000 | Sirois et al. |
| 5,203,147 | A | 4/1993 | Long | 6,087,805 | A | 7/2000 | Langston et al. |
| 5,208,519 | A | 5/1993 | Dykstra et al. | 6,092,355 | A | 7/2000 | Ishmael |
| 5,227,710 | A | 7/1993 | Lewus | 6,094,025 | A | 7/2000 | Rosa |
| D342,425 | S | 12/1993 | Watanabe et al. | 6,104,155 | A | 8/2000 | Rosa |
| 5,301,494 | A | 4/1994 | Peot et al. | 6,105,348 | A | 8/2000 | Turk et al. |
| D346,810 | S | 5/1994 | Schulz et al. | 6,114,833 | A | 9/2000 | Langston et al. |
| D347,640 | S | 6/1994 | Chunn et al. | 6,124,791 | A | 9/2000 | Wolf |
| 5,321,939 | A | 6/1994 | Fuse et al. | 6,154,007 | A | 11/2000 | Shaver et al. |
| 5,325,650 | A | 7/1994 | Fuse et al. | 6,170,179 | B1 | 1/2001 | Paytas et al. |
| 5,379,991 | A | 1/1995 | Delam et al. | 6,170,241 | B1 | 1/2001 | Shibilski et al. |
| 5,388,176 | A * | 2/1995 | Dykstra et al. ............... 388/811 | 6,172,437 | B1 | 1/2001 | Du |
| D356,581 | S | 3/1995 | Chunn et al. | 6,195,970 | B1 | 3/2001 | Held et al. |
| D357,690 | S | 4/1995 | Gobel | 6,202,396 | B1 | 3/2001 | Thomas |
| 5,410,229 | A | 4/1995 | Sebastian et al. | 6,220,005 | B1 | 4/2001 | Plamper et al. |
| D361,771 | S | 8/1995 | Ledingham | 6,240,713 | B1 | 6/2001 | Thomas |
| 5,440,215 | A | 8/1995 | Gilmore | 6,269,617 | B1 | 8/2001 | Blanchard |
| 5,442,901 | A | 8/1995 | Niemela et al. | 6,286,609 | B1 | 9/2001 | Carrier et al. |
| 5,455,886 | A | 10/1995 | Glenn et al. | D449,840 | S | 10/2001 | Concari et al. |
| 5,490,370 | A | 2/1996 | McNair et al. | D450,064 | S | 11/2001 | Concari et al. |
| 5,528,148 | A | 6/1996 | Rogers | 6,316,891 | B1 | 11/2001 | Hough |
| 5,551,220 | A | 9/1996 | Suller et al. | 6,320,351 | B1 | 11/2001 | Ng et al. |
| D375,963 | S | 11/1996 | Braun et al. | 6,359,344 | B1 | 3/2002 | Klein et al. |
| 5,572,856 | A | 11/1996 | Ku | 6,374,584 | B1 | 4/2002 | Blanchard |
| 5,584,723 | A | 12/1996 | Sutliff et al. | D457,897 | S | 5/2002 | Jong |
| 5,602,459 | A | 2/1997 | Rogers | 6,404,078 | B1 | 6/2002 | Thomas et al. |
| 5,606,851 | A | 3/1997 | Bruener et al. | D460,083 | S | 7/2002 | Rosse |
| 5,610,499 | A | 3/1997 | Rogers | D460,973 | S | 7/2002 | Jong |
| 5,615,540 | A | 4/1997 | Yang | 6,424,799 | B1 | 7/2002 | Gilmore |
| 5,619,845 | A * | 4/1997 | Bruener et al. ............... 320/137 | 6,425,231 | B1 | 7/2002 | Yilmaz |
| 5,638,667 | A | 6/1997 | Ellson et al. | 6,427,429 | B1 | 8/2002 | Brabenec |
| 5,638,668 | A | 6/1997 | Kallevig et al. | 6,456,508 | B1 | 9/2002 | Namai et al. |
| D381,665 | S | 7/1997 | Hinklin et al. | 6,479,958 | B1 | 11/2002 | Thompson et al. |
| 5,686,807 | A | 11/1997 | Kusano et al. | 6,479,964 | B2 | 11/2002 | Woodroffe et al. |
| 5,703,450 | A | 12/1997 | Josephs | 6,484,484 | B1 | 11/2002 | Thomas |
| D390,576 | S | 2/1998 | Shimamura | 6,487,837 | B1 | 12/2002 | Fillman et al. |
| 5,713,189 | A | 2/1998 | Toman | 6,523,334 | B1 | 2/2003 | Dettmann |
| 5,727,372 | A | 3/1998 | Kanitz et al. | 6,525,509 | B1 | 2/2003 | Petersson et al. |
| 5,730,397 | A | 3/1998 | Van Niekerk | 6,531,850 | B1 | 3/2003 | Griffin et al. |
| 5,731,673 | A | 3/1998 | Gilmore | 6,538,403 | B2 | 3/2003 | Gorti et al. |
| 5,736,837 | A | 4/1998 | Noda | 6,558,829 | B1 | 5/2003 | Faris et al. |
| 5,751,124 | A | 5/1998 | Josephs | 6,571,542 | B1 | 6/2003 | Fillman et al. |
| 5,757,154 | A | 5/1998 | Peot | 6,586,908 | B2 | 7/2003 | Petersson et al. |
| 5,757,162 | A | 5/1998 | Weber | 6,591,593 | B1 * | 7/2003 | Brandon et al. ............... 56/10.6 |
| 5,761,892 | A | 6/1998 | Quiroga | 6,604,348 | B2 | 8/2003 | Hunt |
| 5,775,074 | A | 7/1998 | Walter | 6,606,845 | B1 | 8/2003 | Spies |
| 5,775,473 | A | 7/1998 | Cordero | 6,646,406 | B1 | 11/2003 | Pollock et al. |
| 5,787,693 | A | 8/1998 | Dyke | 6,658,829 | B2 | 12/2003 | Kobayashi et al. |
| 5,790,355 | A | 8/1998 | Ishmael | 6,666,008 | B2 | 12/2003 | Iida et al. |
| 5,794,422 | A | 8/1998 | Reimers et al. | 6,668,530 | B2 | 12/2003 | Kern et al. |
| 5,819,513 | A | 10/1998 | Braun et al. | 6,707,268 | B1 | 3/2004 | Bell et al. |
| 5,864,223 | A | 1/1999 | Meyer | 6,720,679 | B2 | 4/2004 | Harada et al. |
| 5,894,715 | A | 4/1999 | Braun et al. | 6,728,607 | B1 | 4/2004 | Anderson |
| 5,906,088 | A * | 5/1999 | Inui et al. ................ 56/10.2 R | D489,734 | S | 5/2004 | Lin |
| 5,910,091 | A | 6/1999 | Iida et al. | 6,729,114 | B2 | 5/2004 | Fillman et al. |
| 5,911,670 | A | 6/1999 | Angott et al. | 6,734,647 | B2 | 5/2004 | Wakitani et al. |
| RE36,250 | E | 7/1999 | Hess et al. | 6,750,622 | B2 | 6/2004 | Simizu et al. |
| 5,934,051 | A | 8/1999 | Hahn | 6,758,030 | B2 | 7/2004 | Dettmann |
| 5,934,053 | A | 8/1999 | Filman et al. | 6,779,749 | B2 | 8/2004 | Laporta |
| 5,937,622 | A | 8/1999 | Carrier et al. | 6,788,020 | B1 | 9/2004 | Pollock et al. |
| 5,937,623 | A | 8/1999 | Wolf | 6,798,160 | B2 | 9/2004 | Wakitani et al. |
| 5,953,890 | A | 9/1999 | Shimada et al. | 6,802,175 | B2 | 10/2004 | Fillman et al. |
| 5,969,507 | A | 10/1999 | Meyer | 6,826,895 | B2 | 12/2004 | Iida et al. |
| 5,974,347 | A | 10/1999 | Nelson | 6,836,614 | B2 | 12/2004 | Gilmore |
| 5,994,857 | A | 11/1999 | Peterson, Jr. et al. | 6,850,029 | B1 | 2/2005 | Pollock et al. |
| 6,009,358 | A | 12/1999 | Angott et al. | 6,857,253 | B2 | 2/2005 | Reimers et al. |
| D419,163 | S | 1/2000 | Sirois et al. | 6,867,561 | B1 | 3/2005 | Pollock et al. |
| 6,018,231 | A | 1/2000 | Shaver et al. | 6,874,306 | B2 | 4/2005 | Hishida |
| D421,265 | S | 2/2000 | Ohsumi et al. | 6,886,317 | B2 | 5/2005 | Jackson et al. |
| 6,018,937 | A | 2/2000 | Shimada et al. | D508,923 | S | 8/2005 | Henssler et al. |
| 6,019,010 | A | 2/2000 | Trinder | D509,513 | S | 9/2005 | Henssler et al. |
| 6,039,598 | A | 3/2000 | Ciavarella | 6,938,400 | B2 * | 9/2005 | Fillman et al. ............... 56/10.6 |

| | | |
|---|---|---|
| 6,943,510 B2 | 9/2005 | Gorti |
| 6,946,762 B2 | 9/2005 | Rinholm et al. |
| 6,948,299 B2 | 9/2005 | Osborne |
| 6,949,898 B2 | 9/2005 | Inui et al. |
| D511,348 S | 11/2005 | Elsworthy |
| 6,977,473 B2 | 12/2005 | Wakitani et al. |
| D513,756 S | 1/2006 | Henssler et al. |
| 6,983,583 B2 | 1/2006 | Bucher |
| 6,987,328 B2 | 1/2006 | Osborne |
| 7,007,446 B2 | 3/2006 | Dettmann |
| 7,015,662 B2 | 3/2006 | Wakitani et al. |
| 7,017,327 B2 | 3/2006 | Hunt et al. |
| 7,023,159 B2 | 4/2006 | Gorti et al. |
| 7,051,498 B2 | 5/2006 | Modzik et al. |
| D523,805 S | 6/2006 | Martin |
| 7,111,443 B2 | 9/2006 | Anderson et al. |
| 7,116,065 B2 | 10/2006 | Wakitani et al. |
| 7,134,261 B2 | 11/2006 | Inui et al. |
| 7,168,227 B2 | 1/2007 | Derby, V et al. |
| 2002/0069631 A1 | 6/2002 | Dyke et al. |
| 2002/0093299 A1 | 7/2002 | Kobayashi et al. |
| 2002/0100265 A1 | 8/2002 | Mil'shtein et al. |
| 2002/0174639 A1 | 11/2002 | Fowler |
| 2002/0184865 A1 | 12/2002 | Short |
| 2003/0037523 A1 | 2/2003 | Shimada et al. |
| 2003/0062723 A1 | 4/2003 | Mancl et al. |
| 2003/0222607 A1 | 12/2003 | Simizu et al. |
| 2004/0135373 A1 * | 7/2004 | Osborne .................... 290/1 A |
| 2005/0005588 A1 | 1/2005 | Jager |
| 2005/0029025 A1 | 2/2005 | Medina |
| 2005/0044835 A1 | 3/2005 | Hishida |
| 2005/0066643 A1 | 3/2005 | Fukushima et al. |
| 2005/0126149 A1 | 6/2005 | Heinz et al. |
| 2005/0146308 A1 | 7/2005 | Quazi et al. |
| 2005/0156559 A1 | 7/2005 | Thibedeau et al. |
| 2005/0188665 A1 | 9/2005 | Reimers et al. |
| 2005/0193707 A1 | 9/2005 | Hancock et al. |
| 2005/0217230 A1 | 10/2005 | Bucher |
| 2005/0230168 A1 | 10/2005 | Fillman et al. |
| 2005/0262819 A1 | 12/2005 | Weber et al. |
| 2006/0042212 A1 | 3/2006 | Shoemaker et al. |
| 2006/0059880 A1 | 3/2006 | Angott |
| 2006/0087280 A1 | 4/2006 | Miyashita et al. |
| 2006/0087285 A1 | 4/2006 | Patridge |
| 2006/0096266 A1 | 5/2006 | Dettmann |

\* cited by examiner

HYBRID ELECTRIC LAWNMOWER

BACKGROUND OF THE INVENTION

The present invention is related to an electric lawnmower and more particularly to an electric lawnmower having a boost/conserve power feature and a dual mode power supplying providing power to a lawn mower motor.

DETAILED DESCRIPTION OF THE EMBODIMENT

Figure 1:
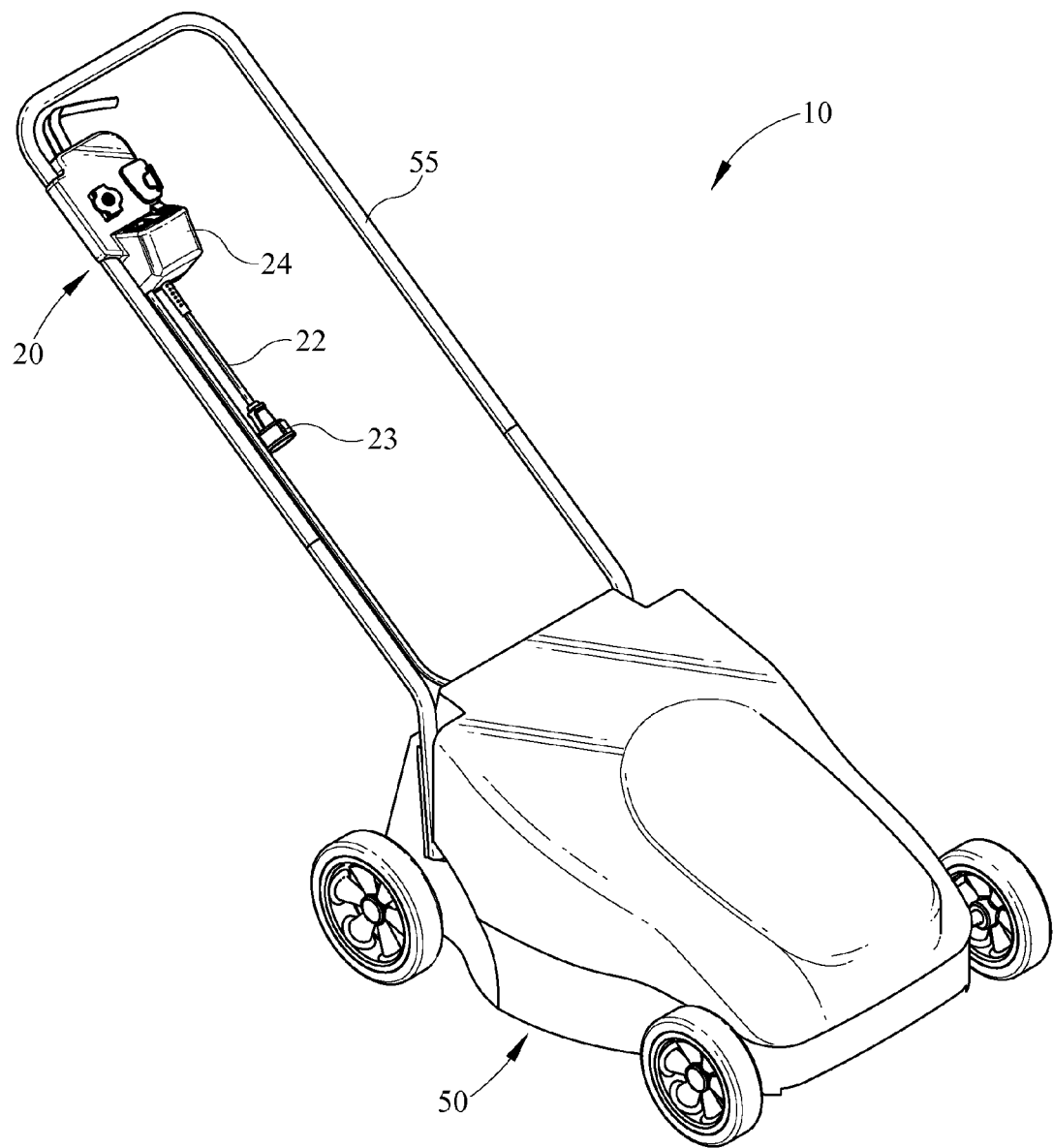
FIG. 1 is a perspective view of the hybrid mower with power boost conserve features of the present invention.

A hybrid electric lawnmower is described herein and set forth in the claims and is partially depicted in the perspective view of FIG. 1 wherein the hybrid mower 10 is shown having a deck 50 with an outwardly extending handle 55. Positioned on the outwardly extending handle 55 is a plurality of controls 20, the controls 20 incorporating a control box 24, an AC plug 22 and an AC receptacle 23. Additionally, contained within the deck 50 are a number of features including, but not limited to, the power control and supply described herein as well as a DC motor, a blade, and other necessary features for making the electric lawnmower described herein operable to function as desired. Such function and structure include the DC motor to drive the blade, the DC motor powered by alternative power supplies which include 120VAC line voltage or DC power supply such as a batter pack. The motor drives the blade and the power supply system of the hybrid electric mower allows the user to select the power source whether it be AC power supply or DC power supply. In either selection, the power control system of the electric mower provides adequate voltage to the motor. Further, a selection is available for the user of the present embodiment to drive the motor in either conserve or boost mode, conserve mode utilizing less power from the power source as boost mode thereby increasing charge time for each full battery charge under such selection, should the DC operation mode be selected, although both conserve and boost mode may be operable in AC operating mode also.

While many options and various embodiments are depicted herein for operation of the hybrid lawnmower with power boost and conserve features, it is to be understood that a wide variety of alternative structures may be utilized in order to incorporate the novel functionality and structures described and claimed. Further, while certain electrical connections and circuits are described for providing operable functionality, it is to be understood that one of ordinary skill in the art would understand the disclosure and functionality described herein, as well as the embodiments and variations described, and include or replace operative alternative structures to perform the same or similar claimed functional elements. As such, the embodiments and particular elements set forth in the description herein are not deemed to be restrictive and are merely provided within the limits of the teachings hereof to be exemplary and should not unnecessarily narrow or limit the controls and electronics which are used to describe various embodiments and examples set forth.

The hybrid mower with a boost conserve feature of the present embodiment is depicted in FIG. 1 with the deck 50 on a plurality of wheels such that the hybrid mower 10 may roll, be powered or be pushed over terrain required to be cut by the blade 51. The specific configuration of the hybrid mower 10 of the present embodiment, as depicted in FIG. 1, is not necessarily limiting in that the many structures and switches which are depicted may be positioned on multiple surfaces or in multiple positions on the hybrid mower 10 and thus, the particular location and limitation of the depictions and structure set forth are considered to be merely exemplary.

The hybrid mower 10 of the present embodiment incorporates controls near the handle 55 such that they may be readily accessible to the operator of the mower 10. These handles and controls, more clearly and specifically disclosed in FIG. 3, include a power selection switch 21, a boost and conserve switch 26, both of which may be located on the control box 24. Integrated within the control box 24 may also be a circuit breaker 28, a clutch release 32 and a blade clutch handle 31, the blade clutch handle 31 acting as an interlock handle switch to engage and disengage the DC motor 56 from rotating the blade 51. Also shown with the controls 20 on the control box 24 is the AC power line 22 which may be directly plugged into AC line voltage which is typically 60 Hz 120 Volts. The AC power line 22 has a plug receptacle 23 for directly connecting to an extension cord or other device in order to provide AC electrical power to the hybrid mower 10 of the present embodiment.

Figure 2:
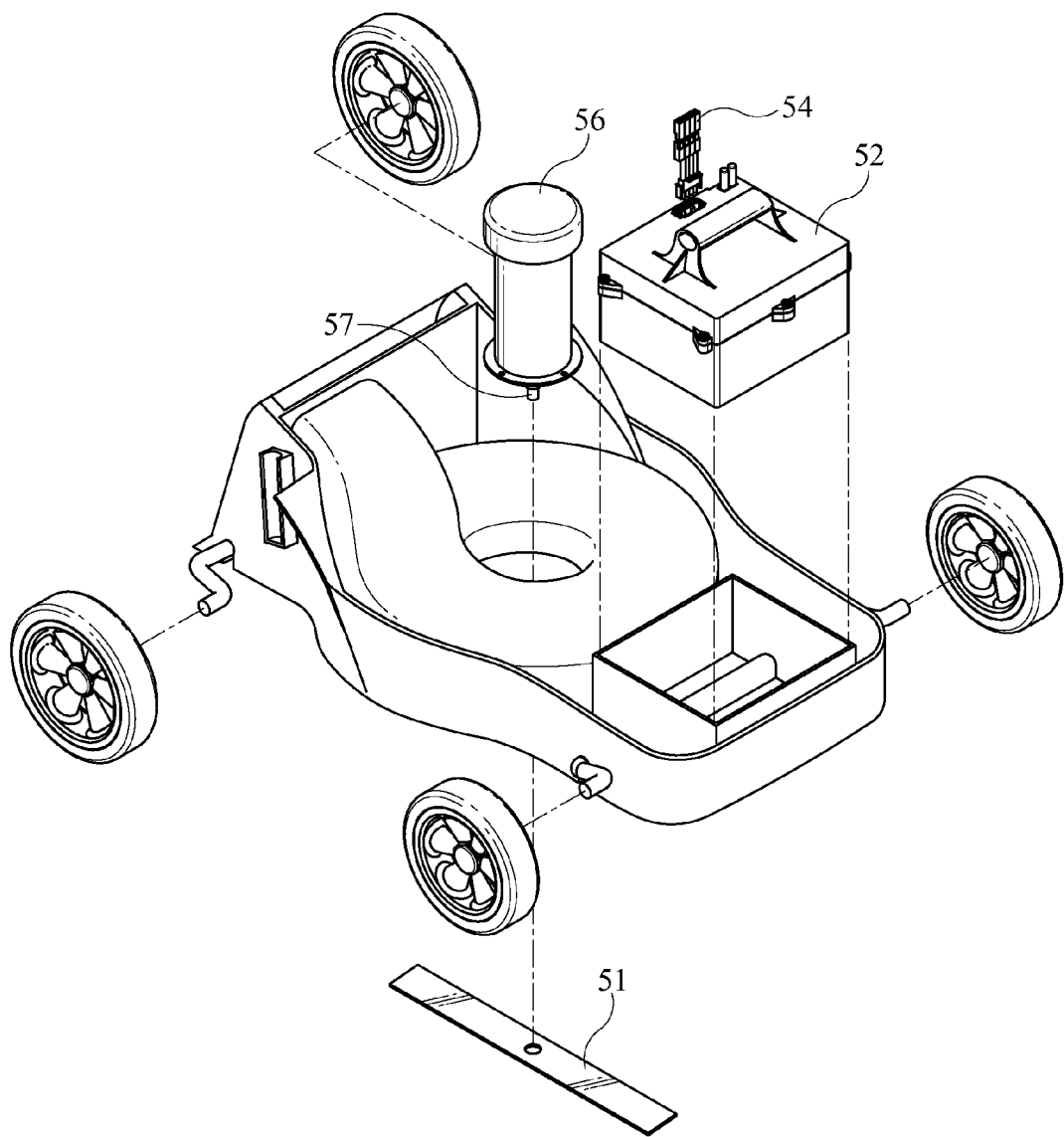
FIG. 2 is an exploded view of the hybrid mower of FIG. 1.

The hybrid mower 10 of the present embodiment is designed to be operated on either AC line voltage from an AC power source such as a wall plug or other AC source, or from a DC battery pack which is mounted on the deck 50 or in close conductive and operative relationship with the DC motor 56 depicted. The hybrid mower 10 of the present embodiment is so designed that the operator may operatively select functionality of the hybrid mower 10 and the motor 56 by either AC or DC power, the DC alternative coming from the battery pack 52 which may be rechargeable. The rechargeable battery pack 52 is mounted, as depicted in FIG. 2, on the deck 50. Additionally, as depicted in the controls 20, the hybrid mower with boost and conserve feature 10 of the present embodiment includes an option a boost conserve switch 26 which provides the functionality of increasing or decreasing the voltage provided to the DC motor 56 thereby increasing or decreasing the rotational speed of the blade 51 based upon the setting of the boost conserve switch 26. As can be commonly understood, the boost conserve switch 26 may increase or decrease the voltage and thereby increase or decrease the actual drain on the battery pack 52 or other power supply due to the increased current provided to the DC motor 56. Thus, as the hybrid mower with power boost conserve feature 10 of the present embodiment is run in the DC power selection option depicted by the DC selection shown in FIG. 3 and selected by the power selection switch 21, the battery pack 52 may be brought in electrical conductivity with the DC motor 56 and the boost and conserve switch 26 may be placed in a conserve switch setting so as to reduce the rotational speed of the blade 51 thereby decreasing the rate of drain of the battery pack 52 and also increasing the run and operation time of the hybrid mower 10 of the present embodiment per charge. Alternatively, the DC motor running based upon AC line voltage may use less current while running at such user selection. Thus, the boost and conserve feature as shown and depicted in the examples and as is effectuated in the present embodiment through the use of the boost conserve toggle switch 26 of FIG. 3 may be integrated with either power selection of the AC power input line or DC power input line to the DC motor 52. Further descriptions and implementations of such examples will be described hereinafter.

Figure 3:
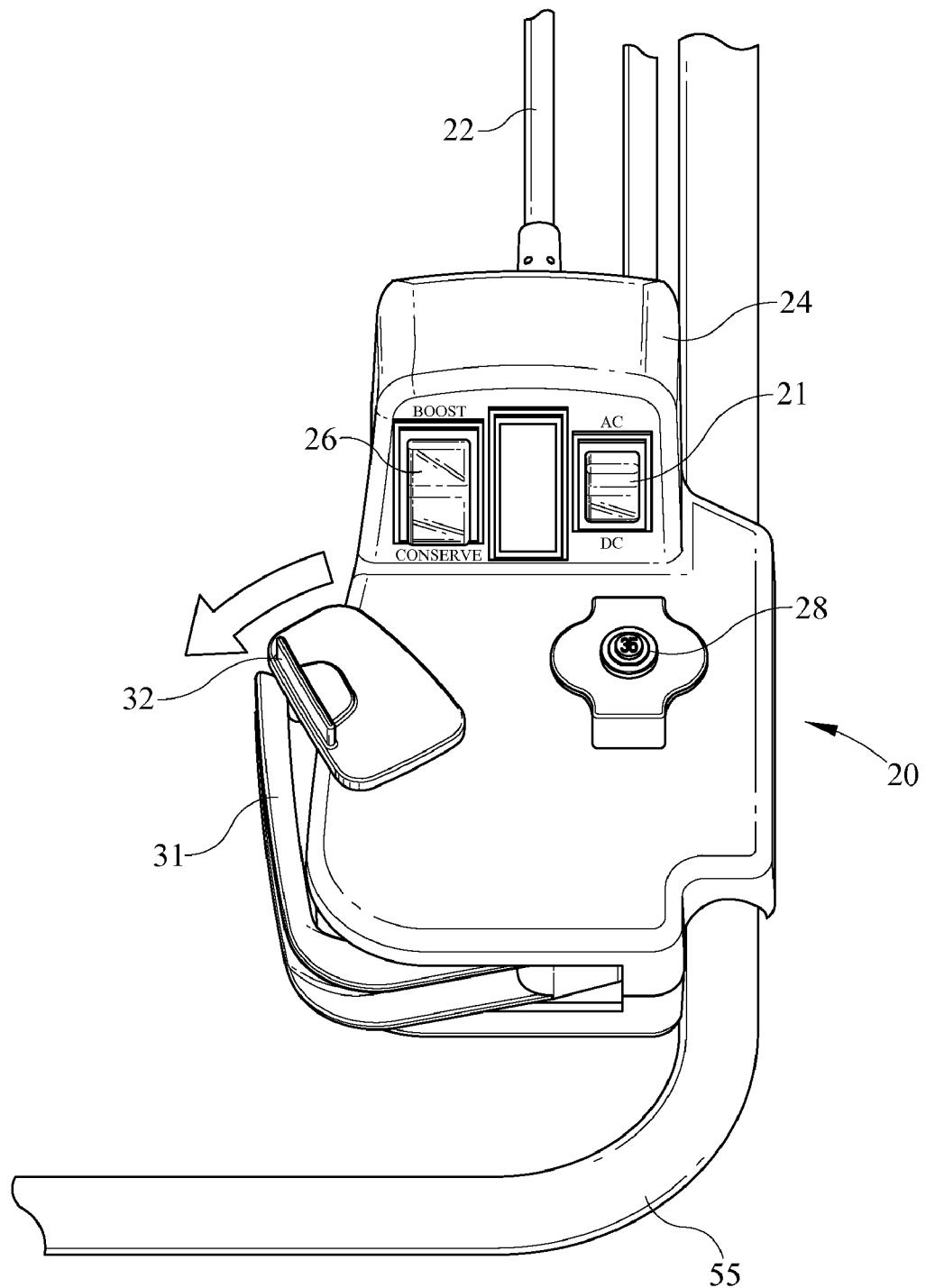
FIG. 3 is a close up view of the controls for the hybrid mower of FIG. 1.
Figure 4:
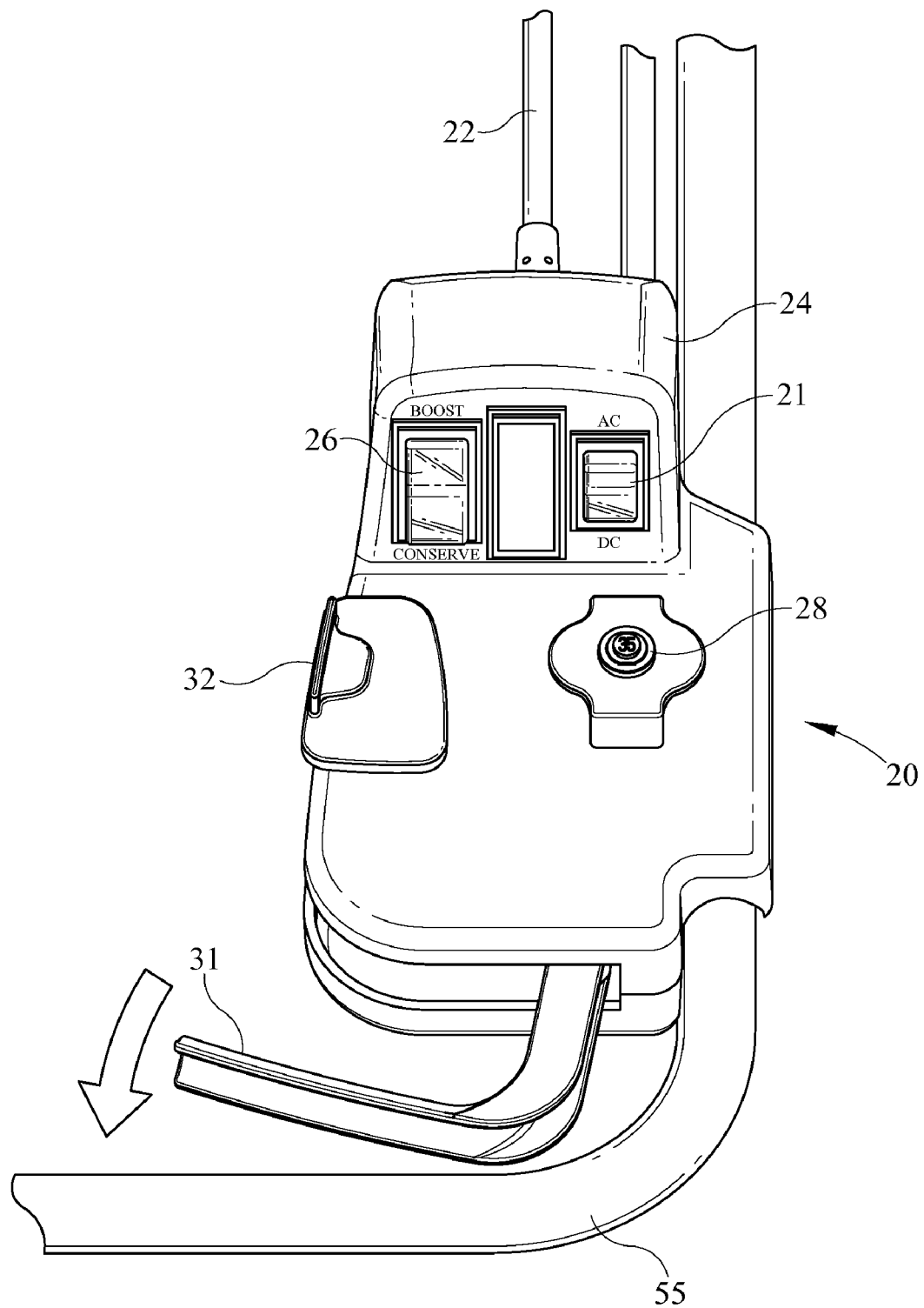
FIG. 4 is a close up view of the controls for the hybrid mower of FIG. 1 with the interlock handle switch activated.
Figure 5:
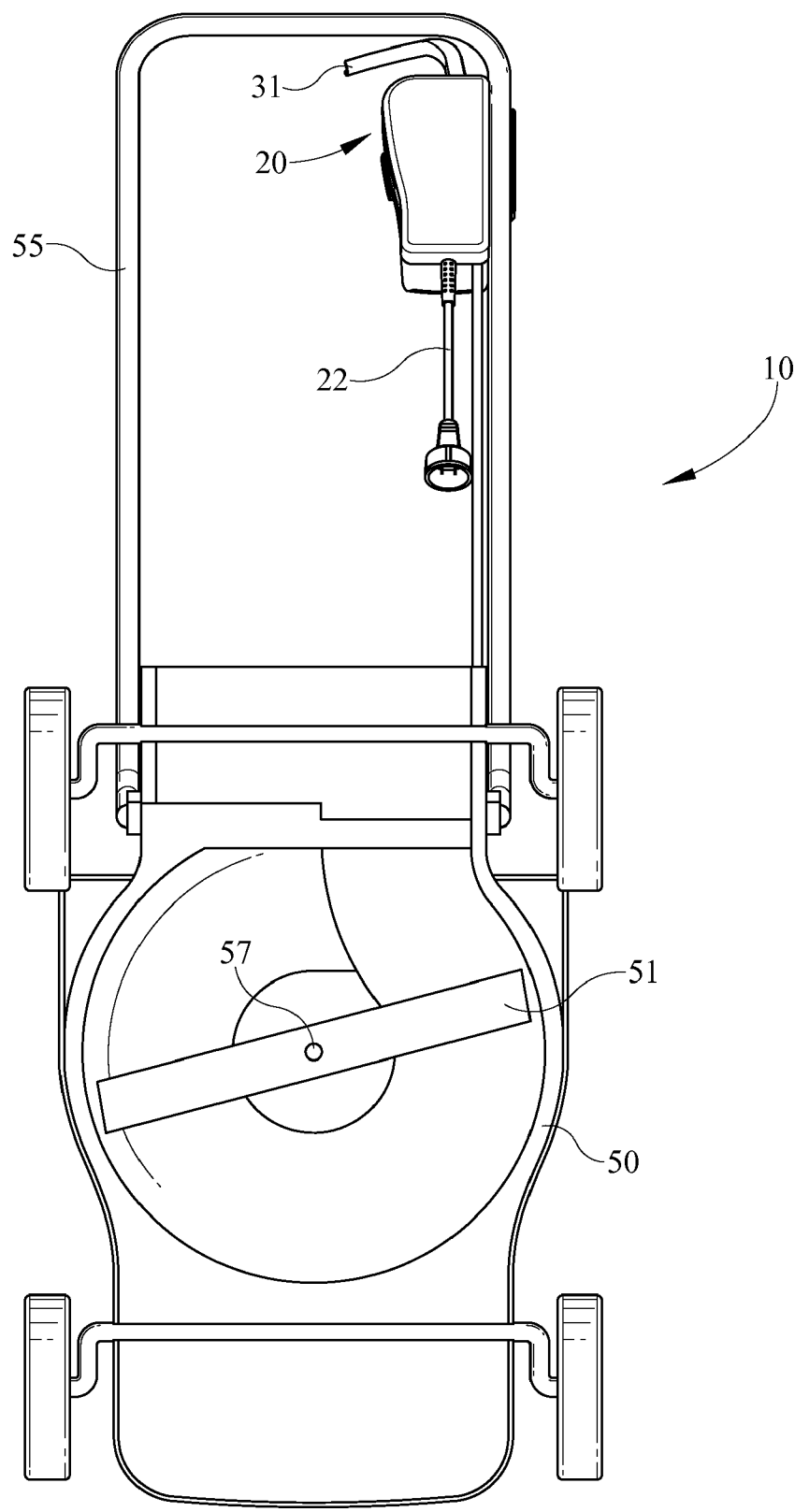
FIG. 5 is a bottom view of the hybrid mower of the present invention depicted in FIG. 1 in combination with the AC power input plug.

As shown in FIG. 3, the controls 20 of the hybrid mower 10 of the present embodiment is depicted with a blade clutch handle 31 and a clutch release 32 such that the blade clutch handle 31 must be operatively held in close relationship to the handle 55 as is commonly understood and known by those of skill in the art in order to engage the DC motor 56 and correspondingly the blade 51. The blade clutch handle 51, when placed and held in close relationship to the handle 55 of FIG. 3, engages an interlock handle switch as will be described herein which may be a double throw switch, and which operates to act as a user's dead man switch in order to disengage the DC motor if released. It is desirable in order to be able to discontinue rotation of the blade 51 upon release of a manually actuatable handle within a limited and short period of time. Thus, the interlock handle switch as depicted herein is integrated with the blade clutch handle 31 and acts to operatively disengage the DC motor and also cause resistive breaking of the motor and thus the blade upon release of the handle 31.

Turning now to particular embodiments and examples as depicted herein, the present embodiment is directed towards a hybrid electric lawnmower which has a boost and conserve feature. Electric lawnmowers, and particularly battery powered mowers, have historically had limited mowing time per charge and have had increased weight due to the battery pack. Thus, prior alternatives had been a corded electric mower with the corresponding restriction of managing a cord and limited power from the household current. When operating off the battery pack, it has been difficult to mow larger lawns due to the limited mowing time per charge and possibly due to greater height of the lawn which would correspondingly reduce the charge and run time for the battery pack.

In the present inventive hybrid mower 10 depicted, the hybrid control system depicted allows for the hybrid mower 10 to be powered from regular household AC line voltage or from a DC voltage battery pack. The battery pack may be designed to have a lower operating voltage available which may be lower than the average peak voltage of the household current. This arrangement may be provided in order to allow the mower to run in a possible conservation mode in order to preserve battery run time under less demanding grass conditions. Alternatively, when the mower is plugged in to AC household current or line voltage or when additional voltage is tapped from the battery pack or from a battery associated with the battery pack, the hybrid mower 10 of the present embodiment may selectively be operated in a boost or power mode, the boost mode allowing the mulching of taller grass or pick up various debris or pine cones from the yard during operation.

It may also be desirable in one of the present inventive embodiments, to provide a battery pack 52 which is easily removable from the lawnmower deck 50, as is depicted in FIG. 2. The hybrid mower 10 of the present embodiment may be used without the battery pack so as to be more easily maneuverable in sloped areas due to the reduced weight of not having the battery pack 52 installed. It may also be easier to stow the mower and charge the battery pack 52 separately or alternatively charging the battery when the mower 10 is still in operation. The DC motor 56, depicted in FIG. 2, may be a permanent magnet type DC motor and may be designed to receive power from the battery and/or from the hybrid power controller which will be described herein. The DC motor 56 may be provided to power the rotating blade 51 while cutting vegetation and the motor 56 may act as a generator in order to provide resistive breaking after deactivation of the inter-lock handle switch described thereby providing a resistive load to stop the blade quickly once the blade clutch handle 31 is released. The motor 56 shown in FIG. 2 may be designed to further provide a fan to promote cooling of the DC motor 56 thereby providing air circulation across the brushes and through the motor. Alternative embodiments with multiple motors or with multiple commutators selectively operating in series or in parallel may also be provided.

As previously described, the blade 51 may be provided in order to mulch or cut vegetation. Typical blades for cutting of vegetation range in a standard operating blade tip speed of about 19,000 ft. per minute. Alternatively, in a low power or conservation mode, the run time can be considerably longer with a battery life expected to be increased by 50% and wherein the speed of the DC motor 56 correspondingly decreases to drive the blade 51 at approximately 14,000 ft. per minute blade speed as measured at the tip of the blade. The various speeds of the blade 51 can correspond to a plurality of voltage outputs from the hybrid power supply as seen by the DC motor 56. Namely, to provide higher speed functionality of the blade, a voltage of sixty-six or seventy-two volts DC may be presented to the DC motor. Alternatively, in conservation or low speed mode, thereby corresponding to higher battery pack run time duration or less current draw from the power supply, the power consumption may be significantly reduced by providing 60 volts or less to the DC motor 56. These various power consumption modes may be provided through the use of the boost and conserve selection switch 26 which, as can be seen from the examples depicted herein, may be a single pole double throw switch as shown in order to increase the voltage through the various means depicted and described in the multiple examples hereof Thus, in conservative mode the corresponding blade speed may be less than 15,000 ft. per minute blade tip measurement and preferably at 14,000 ft. per minute blade tip measurement or less thereby significantly increasing the battery pack charge run time should the battery pack be in operation and the power selection switch 21 be selected in DC mode as depicted in FIG. 3. In such an instance, the 60 volts may be provided to the DC motor which, as depicted in the embodiment of FIG. 2, the battery pack 52 may be provided with a series of five batteries connected in series, each of the batteries providing 12 volts. Alternatively, should the boost/conserve switch 26 be operated in the boost mode while the power switch 21 is in the DC mode, and additional or secondary battery which may be integrated with or separated from the battery pack 52 depicted in the exemplary drawing, may be brought in series with the battery pack 52 power supply thereby increasing the voltage to 66 or 72 volts, depending on the ultimate desirability and blade speed to be operated. Of course, variations may be provided in the configuration and implementation while running in DC mode for the battery pack depicted herein as this example is provided merely for descriptive purposes only and many other embodiments including bringing batteries in parallel, series, or providing additional power sources may be utilized.

While this example of the conserve and boost switch has been provided in the operation of DC mode, alternative embodiments and increase in motor speed may be provided while also running in AC mode will be described herein. Such embodiments may include increasing the step down voltage from the power supply controller as presented to the DC motor or alternatively bringing in series the secondary battery while also operating in AC mode thereby increasing the DC voltage presented to the motor and resulting in an increase rotational speed of the blade. Thus alternative embodiments are shown and depicted wherein the power supply of the present embodiment generates DC power to the motor and wherein the boost or increased voltage may be derived from either the power supply by various techniques known and depicted, or by providing additional voltage from the battery pack or secondary batter, either of which may result in increased operational speed of the motor and blade speed.

One other aspect of the present embodiment of the hybrid mower 10 of the present embodiment is the ability to provide a user selectable power supply to a DC motor driving the blade 51. In the presently depicted hybrid mower 10 of the present embodiment, a DC motor 56 is provided to rotate blade 51 on the mower deck 50 due to its energy use and supply characteristics. A user selectable alternative power supply or power selection switch 21 is provided in order that the DC motor 56 may be user switchable from power sources, namely from an AC 120 volt 60 Hz power input representing line voltage should an extension cord or line voltage be readily accessible or alternatively, to a battery pack DC voltage provided on board of the mower, both power supplies selectable by the operator and both power supplies driving the same motor mounted on the lawnmower housing or deck 50. Such an option is highly desirable and unique in that the user may selectively operate the mower from various user selectable inputs representing alternative power inputs, a first power input being provided at the power selection switch 21 representing a power input line from a battery pack 52, and a second power input being provided at the power selection switch 21 representing the AC line 22.

Figure 6:
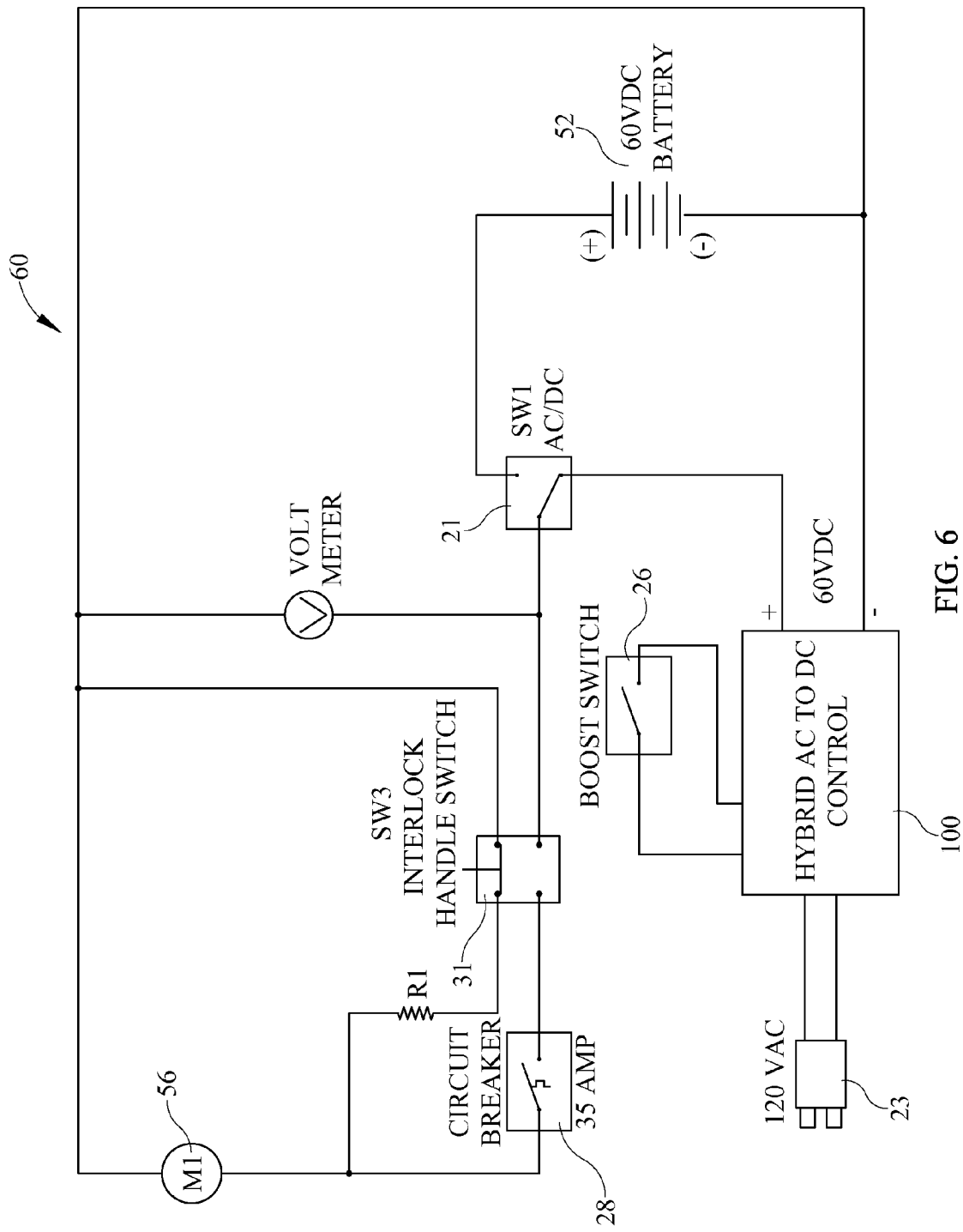
FIG. 6 is a circuit diagram of one option of a power control circuit for use with the hybrid mower with boost conserve feature of FIG. 1.

Turning to an exemplary embodiment shown in FIG. 6 wherein a power control circuit 60 is depicted providing, among other things, the boost and conserve power features of the present embodiment. The DC electric motor 56 is shown in electrical connectivity with the various power control circuit elements 60, 100 which include the inter-lock handle switch 31, for example being a double pole double throw switch, a circuit breaker 28 being, as depicted herein, a 35 amp breaker, a boost/conserve switch 26, in this example being a single pole double throw switch, a power selection switch 21, in this example being a single pole double throw switch, a battery pack 52 which is depicted as a 60 volt DC battery pack providing 60 volts presented to the motor 56 when operatively selected by the power selection switch 21, and a hybrid AC/DC controller 100 which serves as a power inverter or step down controller for converting the line voltage 120 VAC presented by the plug 23. In this present example, the boost selection switch 26 provides an increased voltage to the motor 56 by virtue of modifying an input resistive value or timing signal value to the pulse width modulation control unit 120, which will be described herein, in order to alter the gating of the IGBT thereby affecting the voltage wave form at the output of the power inverter or step down controller 100. The in rush current limiter may be provided as shown in order to prevent oversaturation of the circuit during the initial startup and energizing of the circuit. The rectifier 110 as is commonly understood rectifies the voltage from AC to DC, in this case utilizing a full bridge rectifier as shown. However, many different forms of providing a step down controller are known in the art and the depictions set forth are not to be considered unduly limiting.

As depicted in FIG. 6, the design consists of the AC wall plug 23 which connects to the hybrid AC/DC controller 100 acting as a voltage converter which in turn is connected to a single pole double throw power selection switch 21 and a single pole double throw boost switch 26. The boost switch 26 is the boost conserve switch depicted and described herein and it provides resistive loads to the CMOS micro-controller for the pulse width modulation control 120 depicted when selected and opens the contacts when off. The power selection switch 21 toggles the DC motor between the output of the step down controller 100 and the DC battery voltage source 52. The output of the power selection switch 21 feeds a voltage meter shown which may be connected in parallel with the double pole double throw inter-lock handle switch 31, the inter-lock handle switch 31 toggling between shorting the DC motor 56 through resister R1 to ground and connecting the output of the power selection switch 21 through a circuit breaker 28 to the DC motor 56.

In this embodiment as depicted in FIG. 6, the boost switch 26 may provide increased voltage to the motor 56 when the hybrid mower 10 of the present embodiment is plugged in and running off of line voltage AC power. Such boost may be effectuated by modifying the pulse width modulation control 120 through alteration of the input resistive load at input pin 7 of the micro-controller shown in FIG. 7. More description of the power inverter and/or step down controller 100 of the presently inventive power supply will be set forth herein.

Figure 8:
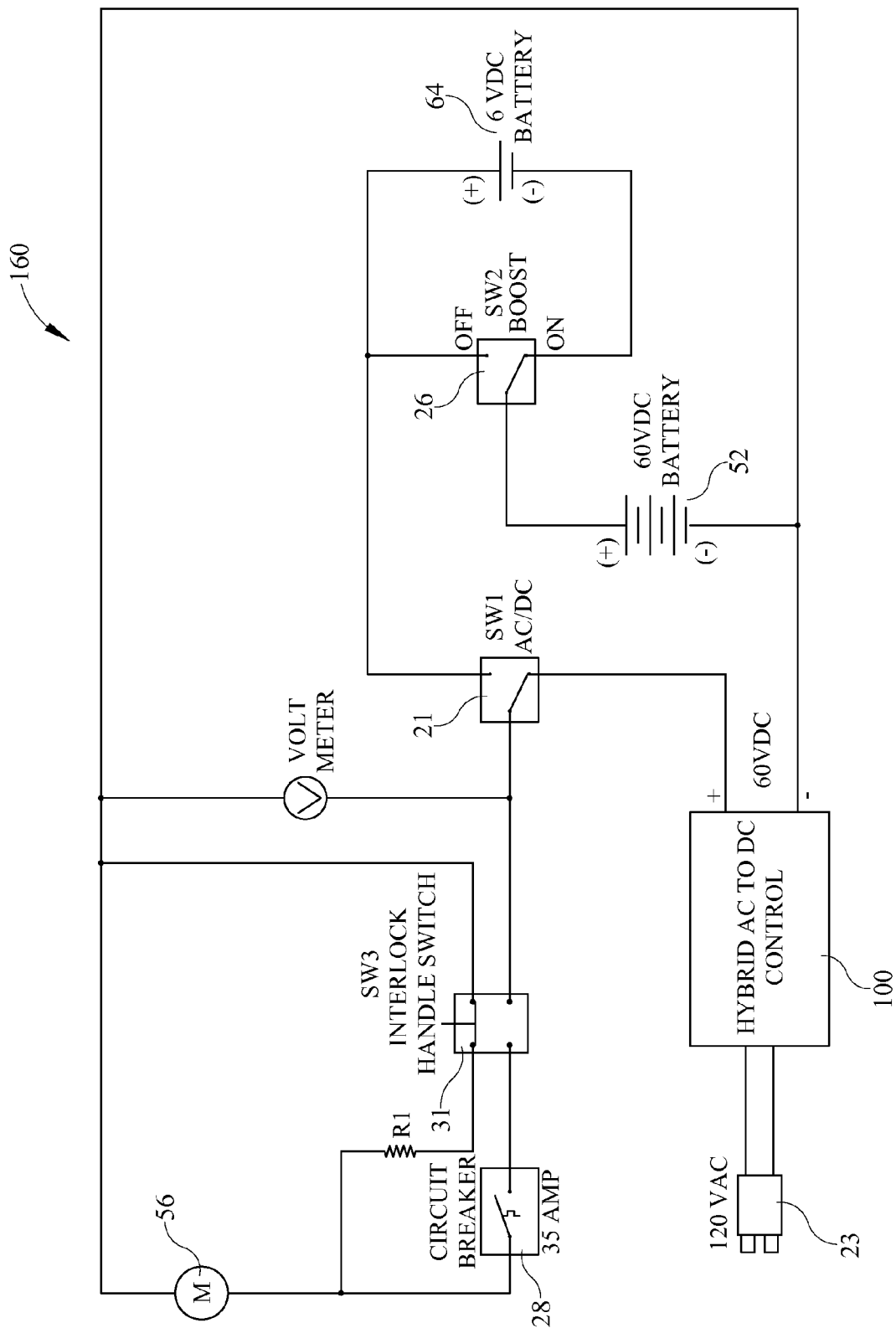
FIG. 8 is one option of the power control circuit for use with the hybrid mower with boost conserve feature depicted in FIG. 1.

Turning to an additional embodiment for the power supply circuit 160 of the present embodiment in FIG. 8, this embodiment provides an AC wall plug 23 which connects to an AC voltage to the hybrid AC/DC controller 100 which in turn is connected to the power selection switch 21 which allows toggling between output of the AC/DC hybrid controller 100 when in the AC selection and to a boost conserve switch 26 and alternative power source when in the DC position. The boost conserve switch 26 toggles between shorting the positive side of the battery source 52 directly to the boost switch 26 went off and connecting the battery source 52 in series with the secondary or boost battery 64 before connecting to the power selection switch or AC/DC switch 21. The power selection switch 21 then feeds a voltage meter V which is connected in parallel with an inter-lock handle switch 31, here depicted as a double pole double throw switch. The inter-lock handle switch 31 toggles between shorting the DC motor 56 through a resistor R1 to ground and connecting the output of the power selection switch 21 through the circuit breaker 28 to the DC motor 56.

As depicted, in the example shown in FIG. 8, additional voltage is provided to the DC motor 56 when the hybrid mower is positioned in the DC power selection option and activation of the boost switch 26 thereby providing an additional 6 volts DC to the 60 volts DC provided by the battery 52. A secondary battery 64 provides additional voltage to the motor thereby increasing the motor speed and corresponding blade speed through actuation of the boost/conserve switch 26 to the boost setting. Thus, the power control circuit or power supply 160 depicted in FIG. 8 allows the operator while in the DC battery operation mode to increase the operating speed of the motor 56 corresponding to the additional voltage provided by the secondary battery 64. Controls are also provided allowing the operator to select between the operation of the motor 56 through the use of line voltage, namely 120 VAC, or through the use of the battery pack 52. Depicted herein is a secondary boost battery 64 which is provided as separate to the battery pack 52, but it may be more practical to provide a secondary boost battery 64 in combination with and contiguous to the battery pack 52 as assembled and shown in the figures. Thus, the secondary boost battery 64 may be continuous with the battery pack 52 or may be separate but is provided to add additional voltage to the motor 56 in order to modify the operating output voltage of the power supply as presented to the motor 56.

The hybrid AC/DC controller 100 as shown provides both power inverter and step down capabilities in order to modify and regulate the 120 VAC to the proper voltage required to run the DC motor 56. However, these functions are provided to be only exemplary. The controller 100 acts as an inverter via rectifier 110 and also to properly modulate the voltage via the PWM controller 120 and associated gates. The power inverter and step down controller 100 may be part of the power supply or power control module 60, 160, 260 and 360 as needed, or may be excluded, depending on the voltage characteristics of the input line voltage and the requirements of the electric motor implemented in the present design.

Figure 9:
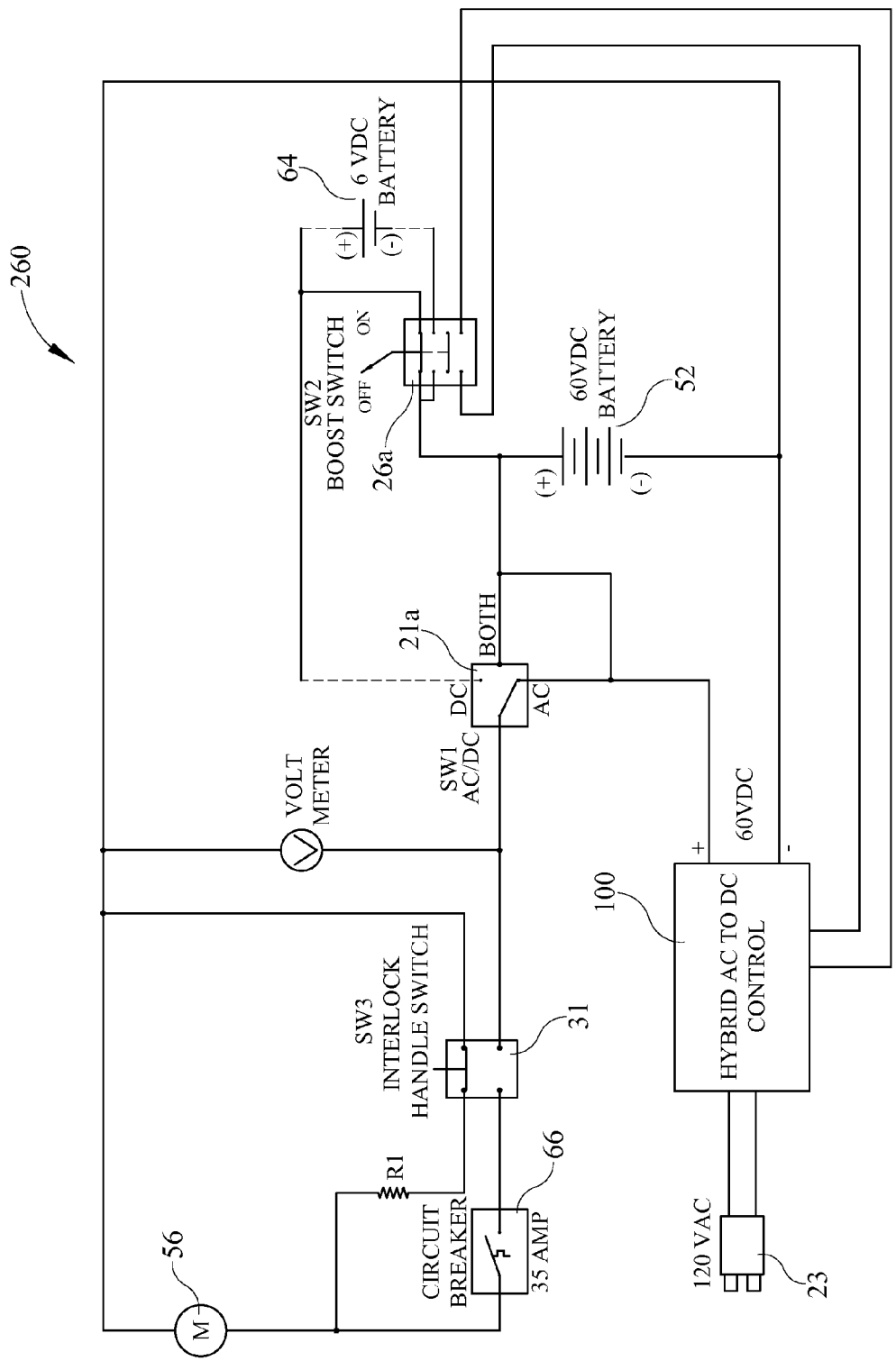
FIG. 9 is one option of the power control circuit for use with the hybrid mower with boost conserve feature for the lawnmower depicted in FIG. 1.

An alternative construction for the power control is the power supply circuit 260 depicted in FIG. 9 wherein both 120 VAC may be provided to supply power to the motor 56 while optionally a 60 volt DC battery may be provided as operatively selectable by the user through the power selection switch 21a. As depicted in this example, the boost switch 26a is operative to bring in series a secondary battery 64 which is 6 volts DC (when set in "BOTH" mode) with the voltage provided by the hybrid controller 100 of the power supply or the battery pack 52. The secondary battery 64, as previously described and as depicted in this embodiment of the power control circuit 260, may be in combination with the battery pack or secondary and separate thereof. Additionally, as shown in the example, the 6 volt battery is brought into the circuit in series with the DC output of the hybrid control 100 or with the battery pack 52. Also, many variations for the structure, assembly and actual value of the secondary battery 64 for all embodiments may be provided in order to increase the voltage to the motor 56. As depicted in FIG. 9, the power selection switch 21a further provides for three settings allowing user selectable options of powering the DC motor 56 by either 120 VAC, direct battery pack connection or a hybrid BOTH connection. When operating in the strictly 120 VAC mode, the hybrid AC to DC control 100 is depicted regulates and modulates the voltage for proper supplying of voltage to the DC motor 56. Alternatively, the power selection switch 21a provides for a DC operation whereby the motor 56 is operated merely by the battery pack 52. A third option is placement of the power selection switch 21a into the BOTH mode wherein there may be a limited amount of power contribution from the battery. In such instance, voltage drops caused by increased load on the motor 56 may result in increased contribution from the battery pack 52. Additionally, as depicted in the embodiment shown, the boost conserve switch 26a may be provided for contribution of additional voltage from the secondary battery 64 when the power selection switch 21a is placed in either the BOTH or DC mode. In such an instance, the secondary battery 64 is brought in series with the voltage contribution from either the power supply 100 or the battery pack 52.

Figure 10:
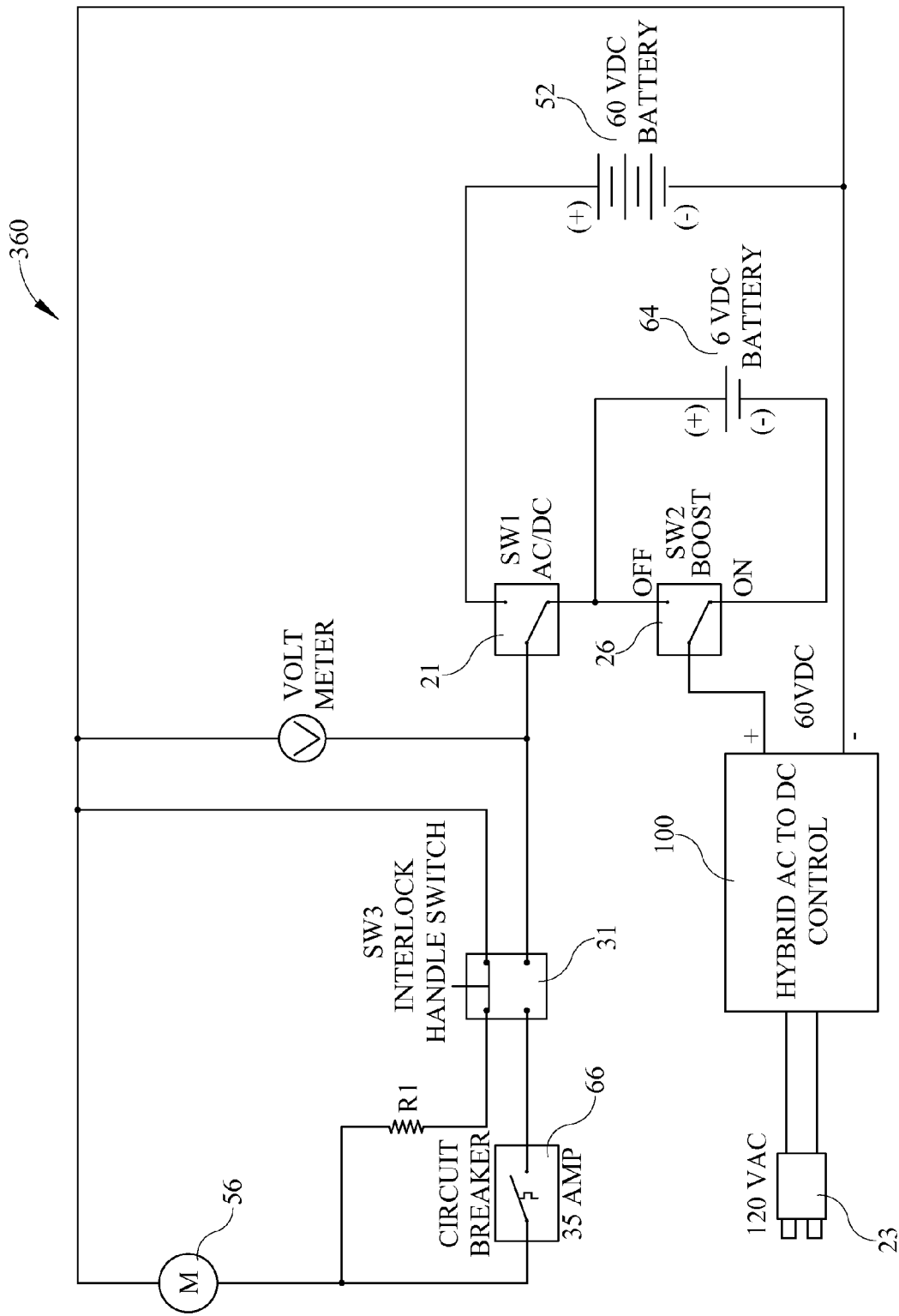
FIG. 10 is one option of the power control circuit for use with the hybrid mower with boost conserve feature as depicted in FIG. 1.

Turning to FIG. 10, an alternative construction and embodiment of the power control and supply circuit 360 is depicted. In the example depicted, the power supply circuit 360 consist of a 120 VAC wall plug 23 which connects to the hybrid AC controller 100 which in turn is connected to an exemplary single pole double throw boost switch 26 thereby allowing the circuit to bypass boost battery 64 when off or be connected to the boost battery 64 when on. Additionally, the circuit continues to an exemplary single pole double throw power selection switch 21 which toggles between output of the speed selection switch 26 when in the AC position and the DC battery voltage source 52 when in the DC position. The power selection switch 21 feeds a voltage meter V which is connected in parallel with an exemplary double pole double throw inter-lock handle 31, the inter-lock handle switch 31 toggling between short in the DC motor 56 through a resistor R1 to ground and connecting the output of the power selection switch 26 through a circuit breaker 66 to the DC motor 56. In this example of the power control circuit 360, the boost or secondary battery 64 is brought in parallel with the power pack 52 or with the output of the hybrid controller 100 which may increase the current capacity for the motor when in higher speed or boost mode.

Multiple variations of power control module or power supply may be provided and are described herein. When mentioned herein as a hybrid power controller, power supply, power control module, step down controller or hybrid controller, these terms are collectively meant to imply providing electricity to the motor placed on the mower housing. No single element set forth in the exemplary embodiments provided herein, namely the power supply elements of the switches, battery packs, circuit breakers, inverters and modulation elements are to be unnecessarily applied to the interpretation of these terms. In fact, the power supply circuit collectively described herein may be implemented through the use of a significant number of alternative structures for regulation, modulation, controlling or limiting the proper voltage or power to the motor implemented in the examples herein. No unnecessary limitation should be interpreted from the particular use of the term controller, inverter, regulator or regulation or modulation as depicted herein, as one of ordinary skill in the art would be enabled through the teachings hereof to provide significant variations to the particular embodiments and examples disclosed in the figures and stated in the described examples.

Figure 7:
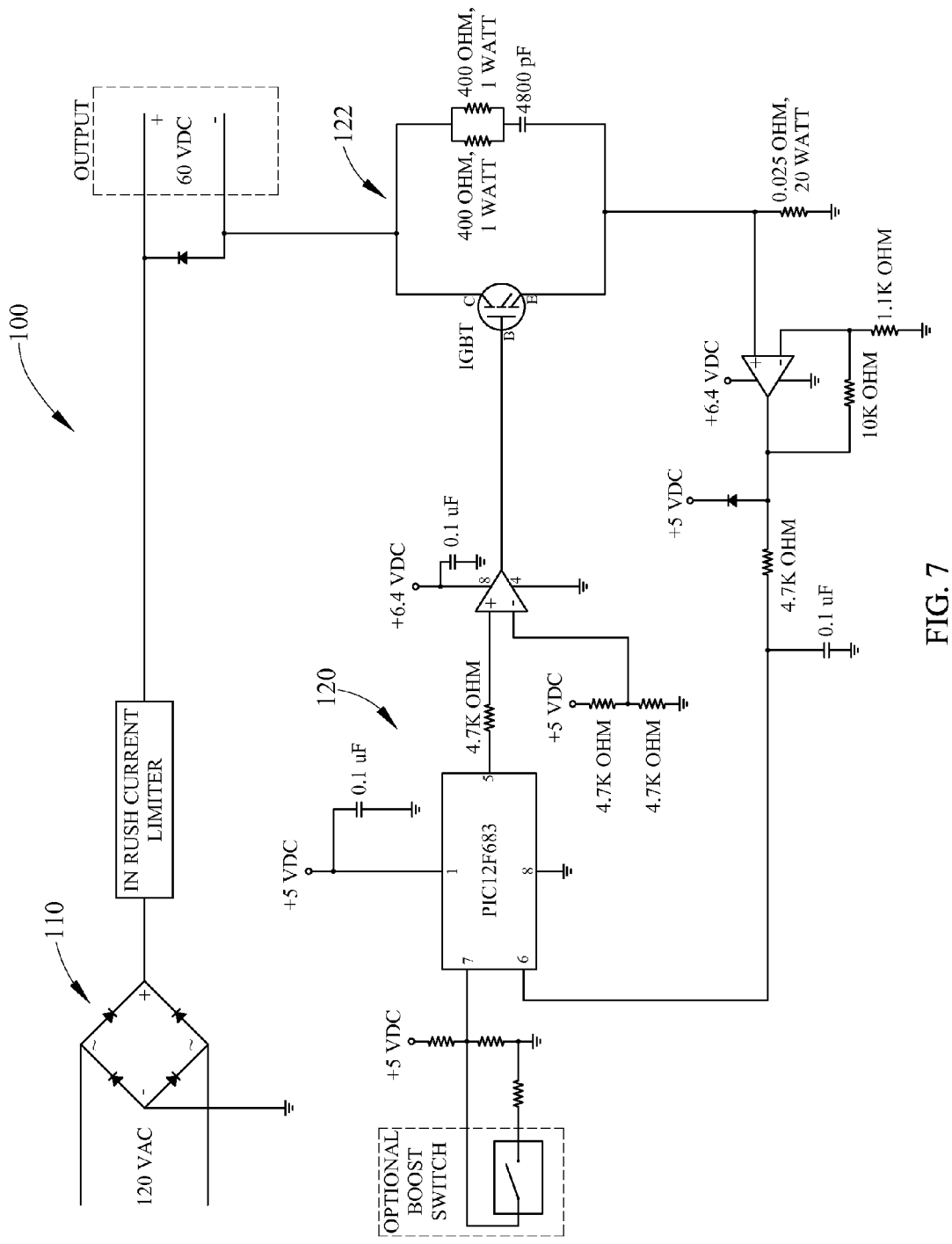
FIG. 7 is a circuit diagram of one option of the power inverter and hybrid control depicted in FIG. 6 for the lawnmower depicted in FIG. 1.

Turning to the exemplary power inverter and in combination step down controller 100 which acts as a portion of the power control module, the hybrid controller 100 receives as input 120 volts AC which, in this example, is inverted utilizing a full bridge rectifier 110 depicted in FIG. 7. An in rush current limiter is provided also to prevent current surges during initial loading of the circuit and prevent further damage or over-saturation. A number of different inverter designs may be used in order to provide voltage rectification. As depicted in the present example, a full bridge rectifier may be utilized but this may be replaced with other known inverter circuitry as is available and known in the art.

In addition, as depicted in FIG. 7, an optional boost switch may be provided which may correspond to the boost switch 26 depicted in FIG. 6. In the present exemplary embodiment, the boost switch may be operable to modify the input to the pulse width modulation controller 120 which defines the voltage output for the step down controller 100. As shown, a micro-controller is utilized in order to set the appropriate pulse rate for the PWM control and feeds into the insulated gate bi-polar transistor (IGBT) which provides the switching or pulse gate driver 122 for the DC output of the hybrid AC/DC control 100. Thus, the hybrid controller 100 incorporates, but does not necessarily require, the utilization of voltage rectification and a voltage rectifier as is necessary in combination with variations of voltage modification such as a pulse width modifier. However, multiple options for step down voltage and control are known and may be utilized such as diode controls, triac controls, MOSFET controls and the like. Many of these are well known in the art and may be utilized in the step down controller and power inverter in combination as described herein. Additionally, as depicted, the pulse width modulation control circuit 120 receives as input in one possible embodiment the ability to modify the voltage by use of the boost switch. The boost switch in this embodiment modifies the reference signal fed into pin 7 of the micro-controller for the reference value which operates to modify the gating of the IGBT and therefore, the voltage characteristics of the DC output depicted. The boost mode depicted provides the alternative function of a boost integrated with the power inverter and step down controller. As shown integrated with the controller 100 in FIG. 6, the boost switch can be alternatively provided in many connections and this integrated boost switch may be integrated with many of the other alternative embodiments.

As is known, many variations of a step down controller and inverter may be utilized and in general, the power control module of the present embodiment may utilize power input of 120 VAC and which incorporates many switches and controls for electrically connecting the DC motor to either the 60 volt DC battery or the DC output of the hybrid power controller. This may include utilization of a power source switch as indicated wherein the power source switch effectively has a first power input as a connection of the power control module of the DC output of the power inverter and step down controller 100 or receive as a second input the 60 volt DC of the battery pack, the power selection switch providing the ability of the operator to switch between 120 VAC power and 60 VDC power from the battery pack. The power selection switch may be directly connected to the DC motor, in this exemplary embodiment a 60 volt DC motor which operates the blade. The 60 volt DC motor may be operationally modified by utilization of a boost switch which is optional in many embodiments depicted herein, the boost switch changing voltage applied to the DC motor from 60 volts by an incremental value thereby increasing rotational speed of the blade as necessary by the operator. Such increase in blade speed, as previously indicated, may be necessitated by thicker grass or due to other items necessarily being mulched by the hybrid mower 10 of the present embodiment. This boost/conserve function which is shown herein provides the ability through the many embodiments disclosed to increase the voltage of the power control module and thereby increases the rotational speed of the blades. As indicated, this may be desirable for short periods of time and may provide a first power output of the power control module, the first power output higher than a second power output, the second power output being a conserve feature wherein the DC motor draws less current and thereby increases the battery life charge of the battery pack. However, such feature does not have to be implemented, as is clearly seen herein, only with the use of DC operation and DC power input as it is apparent that the increase rotational speed (boost) feature may be implemented also with 120 VAC wall power by increasing the DC voltage output of the hybrid AC/DC control 100 or by adding supplemental DC power supply from the operating batteries, whether the primary or secondary.

Many configurations are available for the hybrid mower discussed herein. While the hybrid mower has been described for many embodiments, the invention presented is not limited to the specific structures provided. The invention and claims are intended to cover various modifications and equivalent arrangements included within the spirit and scope of the appended claims and teachings hereof. The scope of the claims is to be accorded the broadest interpretation so as to encompass all such modifications and equivalent structures and functions.

We claim:

1. A hybrid mower with boost and conserve power feature, comprising:
   a mower deck with a rotating blade affixed to an electric DC motor;
   a power control module, in electrical control of said motor, said power control module in electrical connection with an AC power input line and a battery pack, said power control module having a power selection switch for selectively connecting at least one of said AC power input line and said battery pack with said DC motor for causing said DC motor to mechanically rotate the mower blade;
   a power controller on said power control module converting AC power from said AC power input line to DC power; and
   a boost conserve switch on said power control module adjusting a power output of said power control module to a first power output and a second power output, said first power output representing a conserve power feature on said DC motor and said second power output representing a boost power feature on said DC motor,
   wherein said mower is configured with an AC power plug for allowing the mower to be electrically connected with and to receive the AC power input line voltage from a household power socket.

2. The hybrid mower of claim 1, wherein said power control module controls the motor speed of said DC motor by selecting said first power output or said second power output through said boost conserve switch.

3. The hybrid mower of claim 1, wherein said power controller is electrically positioned between said AC power input line and said DC power output of said power inverter.

4. The hybrid mower of claim 3, wherein said power controller is a rectifier and filter combination.

5. The hybrid mower of claim 1, wherein said power controller includes a step down controller.

6. The hybrid mower of claim 5, wherein said step down controller includes a voltage rectifier and a pulse width modulator.

7. The hybrid mower of claim 2, wherein said DC motor speed for said second power output is above about 15,000 feet per minute blade speed and said DC motor speed for said first power output speed is below about 14,000 feet per minute blade speed.

8. The hybrid mower of claim 2, wherein said DC motor has a voltage input above 70 volts at said first power output of said power control module and about 60 volts at said second power output of said power control module.

9. The hybrid mower of claim 1, wherein said boost conserve switch is operative when said power source switch electrically connects said battery pack to said DC motor.

10. The hybrid mower of claim 9, wherein said boost conserve switch is operative to engage a secondary battery in series with an output voltage of said power control module.

11. The hybrid mower of claim 1, wherein said boost conserve switch is operative to engage a secondary battery in series with an output voltage of said power control module.

12. A hybrid mower with a boost conserve feature, comprising:
an AC power line-fed step down controller configured for receiving AC power line voltage via an AC power line input, said step down controller further configured for modifying the AC power line voltage to a DC output voltage;
a power selection switch operative to selectively connect a DC motor to at least one of said DC output voltage of said AC power line-fed step down controller or to a DC output voltage of a battery pack;
a boost conserve switch operative to add a secondary battery in series with said battery pack;
said DC motor configured for mechanically turning a cutting blade on a mower housing in response to said power selection switch connecting the DC motor to the AC power line-fed step down controller, the DC motor further configured for mechanically turning said cutting blade in response to said power selection switch connecting the DC motor to the battery pack,
wherein said mower is configured with an AC power plug for allowing the mower to be electrically connected with and to receive the AC power line voltage from a household power socket.

13. The hybrid mower of claim 12, wherein said step down controller includes an inverter.

14. The hybrid mower of claim 13, wherein said inverter is a full bridge rectifier.

15. The hybrid mower of claim 12, wherein said step down controller includes a rectifier in combination with a pulse width modulation circuit.

16. The hybrid mower of claim 12, wherein said mower further has an interlock handle switch actuatable to engage and disengage said DC motor from said battery pack or said step down controller.

17. The hybrid mower of claim 12, wherein said secondary battery output voltage is about six volts.

18. The hybrid mower of claim 12, wherein said secondary battery is integrated with said battery pack.

19. The hybrid mower of claim 12, wherein said secondary battery is in series with said DC output voltage of said step down controller, said boost conserve switch operative to add said secondary battery output voltage to said DC motor.

20. An electric lawnmower, comprising:
a mower deck with a DC motor electrically connected to a mower handle safety switch, a power selection switch in electrical connection with said mower handle safety switch and to both a battery pack and an AC power line-fed power controller, an AC power line connected to said power controller, said power controller configured for converting power provided from said AC power line to a DC output voltage, and said power controller configured with a step down controller for modifying the DC output voltage to generate a modified DC output for said power controller, said power selection switch operable to selectively and electrically connect said battery pack to said DC motor for causing said motor to mechanically rotate a cutting blade of the mower, said power selection switch operable to selectively and electrically connect said AC power line-fed power controller to said DC motor for causing said motor to mechanically rotate the cutting blade of the mower, wherein said mower is configured with an AC power plug for allowing the mower to be electrically connected with and to receive AC power input line voltage from a household power socket.

21. The electric lawnmower of claim 20, wherein said step down controller includes a pulse width modulation controller.

22. The electric mower of claim 21, further comprising:
a boost switch integrated with said step down controller to selectively increase said modified DC output of said power controller upon activation of said boost switch.

23. The electric lawnmower of claim 22, wherein said boost switch modifies an input timing signal in said pulse width modulation controller.

24. The electric mower of claim 20, further comprising
a secondary battery in series with said battery pack, said secondary battery connected in series with said battery pack upon activation of a boost conserve switch.

25. The electric mower of claim 21, wherein said pulse width modulation controller includes a CMOS micro-controller and an IGBT.

26. A hybrid mower, comprising:
a DC motor electrically connected to a power supply and attached to a rotatable blade below a mower deck;
said power supply operable to electrically connect said DC motor to at least one of: a battery pack and an AC electrical line for causing the DC motor to mechanically rotate said mower blade, said power supply has a power selection switch representing said electrical connection to said battery pack or said AC electrical line;
said power supply also having a boost conserve switch actuatable to a first and a second position and operable when said DC motor is in electrical connectivity with said battery pack, said first position running said DC motor at a first speed, said second position running said DC motor at a second speed, said first speed being greater than said second speed,
wherein said mower is configured with an AC power plug for allowing the mower to be electrically connected with and to receive AC power input line voltage from a household power socket.

27. The hybrid mower of claim 26, wherein said power supply has a voltage inverter and a step down controller.

28. The hybrid mower of claim 27, further comprising:
a secondary battery in electrical connection with said boost conserve switch, said secondary battery brought into electrical connection with said motor when said boost conserve switch is in said first position.

29. The hybrid mower of claim 27, wherein said boost conserve switch is electrically connected to said power supply providing an input to said step down controller.

30. The hybrid mower of claim 29, wherein said inverter is a full bridge rectifier.

31. The hybrid mower of claim 27, wherein said step down controller is one of a diode based voltage controller, a triac controller or a MOSFET based controller.

32. An electric lawn mower having a blade drive motor electrically connected to a first and a second power supply, comprising:
an AC input line providing 120 VAC to a hybrid AC to DC controller, said hybrid controller being an AC input line-fed hybrid controller said hybrid controller connected to a power selection switch;
a battery pack providing greater than about 60 volts DC to said power selection switch;
an electric motor electrically connected to said power selection switch, wherein said power selection switch is operable to electrically connect said electric motor to said battery pack for causing the electric motor to mechanically rotate a cutting blade of the mower via electrical power provided by the battery pack, said power selection switch being further operable to electrically connect said electric motor to said AC input line-fed hybrid controller for causing the electric motor to mechanically rotate the cutting blade of the mower via electrical power provided by the AC input line-fed hybrid controller;

a boost and conserve switch operable to increase the voltage supplied to said electric motor by a predefined amount, said increase in voltage supplied to said electric motor increasing the rotational speed of said motor, said boost and conserve switch electrically connected to a DC voltage source providing said increase in voltage, wherein said mower is configured with an AC power plug for allowing the mower to be electrically connected with and to receive AC power input line voltage from a household power socket.

* * * * *